United States Patent
Kougiouris et al.

(10) Patent No.: US 6,182,158 B1
(45) Date of Patent: *Jan. 30, 2001

(54) METHOD AND SYSTEM FOR PROVIDING INTEROPERABILITY AMONG PROCESSES WRITTEN TO EXECUTE ON DIFFERENT OPERATING SYSTEMS

(75) Inventors: Panagiotis Kougiouris, Mountain View; Peter W. Madany; Sanjay R. Radia, both of Fremont; Anil S. Shivanlingiah, San Ramon, all of CA (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/915,153

(22) Filed: Aug. 19, 1997

Related U.S. Application Data

(63) Continuation of application No. 08/422,737, filed on Apr. 14, 1995, now abandoned.

(51) Int. Cl.[7] .................................................. G06F 15/163
(52) U.S. Cl. ............................................................ 709/328
(58) Field of Search .................................... 395/680, 683, 395/682; 709/300, 307, 328, 310

(56) References Cited

U.S. PATENT DOCUMENTS 5,067,072 * 11/1991 Talati et al. .............................. 717/8
5,175,854 * 12/1992 Cheung et al. ...................... 709/100

(List continued on next page.)

FOREIGN PATENT DOCUMENTS 0567971 11/1993 (EP).

OTHER PUBLICATIONS

Yousef A. Khalidi, Michael N. Nelson; An Implementation of Unix on an Object–oriented Operating System; pp. 1–11, Jan. 1993.*

(List continued on next page.)

Primary Examiner—Kenneth R. Coulter
(74) Attorney, Agent, or Firm—Beyer Weaver & Thomas, LLP

(57) ABSTRACT

An embodiment of the present invention provides an efficient and robust way to facilitate interoperability between two or more processes which were initially written to execute on top of two different operating systems but instead execute on top of a third operating system. Typically, the preferred embodiment begins by launching a parent process which was initially written to execute on top of a first operating system. The preferred embodiment then obtains a context object that implements a naming graph for the parent process. The context object includes bindings between a given set of names and an associated set of objects that are specific to the first operating system.

At some point during execution of the parent process, the parent process spawns a child process which was initially written to execute on top of a second operating system. Next, the parent process instantiates a copy of its context object. The parent process then performs a context merge operation which ensures that object names used by the second process are interpreted relative to a context object associated with the second operating system before (or in lieu of) being interpreted relative to the context object for the first operating system.

Once the context merge operation is complete, the new context object is passed to the child process and execution of the second process begins. System calls initiated by the child process will therefore be interpreted relative to the name space for the second operating system. In this way two processes which were initially written to execute on top of two different operating systems can interoperate while executing on top of yet a third operating system.

24 Claims, 11 Drawing Sheets

U.S. PATENT DOCUMENTS

| | | | | |
|---|---|---|---|---|
| 5,249,293 | * | 9/1993 | Schreiber et al. | 709/203 |
| 5,313,578 | * | 5/1994 | Handorf | 709/314 |
| 5,337,412 | * | 8/1994 | Baker et al. | 709/324 |
| 5,442,791 | * | 8/1995 | Wrabetz et al. | 709/330 |
| 5,515,508 | * | 5/1996 | Pettus et al. | 709/203 |
| 5,544,316 | * | 8/1996 | Carpenter et al. | 709/200 |
| 5,577,252 | * | 11/1996 | Nelson et al. | 709/100 |

OTHER PUBLICATIONS

Designing a Process Migration Facility: the Charlotte Experience; Y. Artsy et al.; Computer, vol. 22, Issue 9; pp. 47–56, Sep. 1989.*

A Software Facility for Load Sharing and Parallel Processing in Workstation Environments; G. C. Shoja et al.; Proc. of the 21st Annual Hawaii Intern'l Conf. on System Sciences, Jan. 1988.*

Network Tasking in the Locus Distributed UNIX System; D. A. Butterfield et al.; USENIX Summer Conference Proceedings; pp. 62–71, 1984.*

Computer Design, vol. 23, No. 9, Aug. 1984, Littleton, Massachusetts, US,. pp. 205–214, Ross A. Bott: "Dual port solves compatibility problem".

Computer Communications, vol. 14, No. 6, Jul. 1, 1991. pp. 324–335, A.S. Tanenbaum: "The Amoeba Distributed Operating System—A Status Report".

"The Spring Name Service", orginally appeared as Sun Microsystems Laboretories Technical Report SMLI–93–16, Oct. 1993, Copyright (C) 1993 Sun Microsystems, Inc.

"Naming Policies in the Spring System", orginally appeared in the Proceedings of the 1st International Workshop on Services in Distributed and Networked Environments, Copyrights (C) 1994 IEEE.

"Building the Operating System of the Future: How the Lessons of UNIX (TM) are Shaping Plan 9", by Dennis Ritchie (Transcript of Keynote talk at UniForum '94), Mar. 24, 1994 9 pages.

AT&T News Release AT&T Software Solutions Demonstrates Plan 9 From Bell Labs at UniForum '95, Mar. 14, 1995, 3 pages.

* cited by examiner

METHOD AND SYSTEM FOR PROVIDING INTEROPERABILITY AMONG PROCESSES WRITTEN TO EXECUTE ON DIFFERENT OPERATING SYSTEMS

This is a continuation of Kougiouris et al.'s copending application Ser. No. 08/422,737, now abandoned, entitled "METHOD AND SYSTEM FOR PROVIDING INTEROPERABILITY AMONG PROCESSES WRITTEN TO EXECUTE ON DIFFERENT OPERATING SYSTEMS," filed Apr. 14, 1995.

BACKGROUND OF THE INVENTION

1. Field of the Invention

The method and system of the present invention relates generally to the field of computer program interoperability, and, more particularly, to the field of facilitating interoperability between two or more processes which were initially written to execute on top of two different operating systems but instead execute on top of a third operating system.

2. Background of the Invention

A number of different operating system vendors are currently developing new operating systems. A design goal for some of these new operating systems is to provide interoperability among incompatible legacy applications running on top of the new operating system. For example, developers of the new Spring operating system from Sun Microsystems would like to provide interoperability between applications written for the Solaris 1.x family of operating systems and for the Solaris 2.x family of operating systems[1]. The problems with fulfilling this design goal are two-fold. First, the legacy applications are incompatible among themselves if they were written to run on top of different legacy operating systems. For example, a word-processing program written to run on top of the Solaris 2.4 operating system may be unable to interact with a spreadsheet program written to run on top of the Solaris 1.0 operating system. Therefore, a user of these application programs would be unable to create a compound document, such as a sales report, which included text from the word-processing program and spreadsheet cells from the spreadsheet program.

1. Sun, Solaris, and Sun Microsystems are registered trademarks of Sun Microsystems, Inc. Spring is an in-ternal code name only and is not intended to represent either a trademark or a commercial product name.

Second, the legacy applications are incompatible with the new operating system because they were not written to run on top of the new operating system. Therefore, without further improvements, the legacy applications would be unable to run on top of the new operating system.

This incompatibility causes concern among users because users want seamless interoperability between their application programs. Users do not want to concern themselves with the details of compatibility and incompatibility at the operating system level. Likewise, such incompatibility concerns operating system developers because the inability of an operating system to provide interoperability among application programs adversely impacts the marketability of the new operating system.

To overcome these problems the developers of the present invention provide functionality in the new operating system to allow incompatible legacy applications to interact when executing on top of the new operating system.

An example using FIGS. 1A and 1B will help illustrate why applications written to run on top of different legacy operating systems are incompatible with one another and with the new operating system. FIG. 1A illustrates a first application program which runs on top of a first operating system. The computer system 100 of FIG. 1A includes a computer 101, a memory 103, a processor 105, and an interface 107. The memory 103 includes a first application program 109 and a first operating system 111. To accomplish its functions, the first application program 109 makes calls to the first operating system 111 in a format compatible with the first operating system's application programming interface ("API"). The API is an abstract interface to the services and protocols offered by an operating system. The API usually provides a set of function calls which an application invokes to gain access to the operating system's services. The first operating system 111 accepts these calls from the first application program 109, parses the calls to determine what system resource(s) need to be accessed in order to perform the function, performs the requested function by accessing the necessary system resource (e.g. a file) through a name space 112 associated with the first operating system, and returns the results to the first application program.

FIG. 2 illustrates a typical name space 200 used to access directories and files in a computer system. The name space 200 provides a mapping (also called a "binding") between a set of file names 201 and their associated directories or files 203. Given a file name 201 in a name space 200, a user can "resolve" the file name to retrieve the associated file or directory (often called a context). It is important to note that a given file name is always interpreted relative to a particular name space. For example, a directory named "/sys/bin/operating_system," when resolved relative to a name space for the first operating system 111, could refer to a directory containing the binaries for the first operating system. However, when the same name is resolved relative to a name space for a different operating system, a different directory could be returned. In this way the directory names and file names passed along with the call to an operating system only refer to the directories and files in the name space of that operating system.

FIG. 1B illustrates a second application program which runs on top of a second operating system. The computer 113 includes a memory 115, a processor 117, and an interface 119. The memory 115 includes a second application program 121, a second operating system 123, and a second name space 124. To accomplish its functions, the second application program 121 makes calls to the second operating system 123 in a format compatible with the second operating system's API. The second operating system 123 accepts these calls from the second application program 121, performs the requested function by accessing files and directories through the second operating system's name space 124, and returns the results to the second application program.

The API of the first operating system 111 is different than and therefore incompatible with the API of the second operating system 123 because it provides a different set of services and mandates use of a different set of interfaces than the API of the second operating system. Similarly, the name space 112 of the first operating system 111 is different than and therefore incompatible with the name space 124 associated with the second operating system 123 because it provides different bindings between directory or file names and the directories or files themselves.

This incompatibility problem can be addressed in at least two different ways. First, independent software vendors can "port" their application programs to the new operating system. While this solution is desirable, due to the cost of porting an application to a new platform this solution is not always viable. The developers of the present invention have therefore provided functionality in the new operating system to allow incompatible legacy applications to interact when executing on top of the new operating system.

SUMMARY OF THE INVENTION

An embodiment of the present invention provides an efficient and robust way to facilitate interoperability between two or more processes which were initially written to execute on top of two different operating systems but instead execute on top of a third operating system. Typically, the preferred embodiment begins by launching a parent process which was initially written to execute on top of a first operating system. The preferred embodiment then obtains a context object that implements a naming graph for the parent process. The context object includes bindings between a given set of names and an associated set of objects that are specific to the first operating system.

At some point during execution of the parent process, the parent process spawns a child process which was initially written to execute on top of a second operating system. Next, the parent process instantiates a copy of its context object. The parent process then performs a context merge operation which ensures that object names used by the second process are interpreted relative to objects from a context object associated with the second operating system before (or in lieu of) being interpreted relative to objects from the context object for the first operating system.

The new context object is then passed to the child process and execution of the second process begins. Therefore, system calls initiated by the child process will first be interpreted relative to the name space for the second operating system. The child process can further create other child processes designed to execute on other operating systems. In this way two processes which were initially written to execute on top of two different operating systems can interoperate while executing on top of yet a third operating system.

DESCRIPTION OF THE PREFERRED EMBODIMENT

Overview Of The Preferred Embodiment

A preferred embodiment of the present invention provides an improved method and system that facilitates interoperability between two or more processes which were initially written to execute on top of two different operating systems but instead execute on top of a third operating system. Typically, the preferred embodiment begins by invoking a parent process which was initially written to execute on top of a first operating system. During process invocation, the preferred embodiment obtains a context object that implements a name space (or, more precisely, a naming graph) for the parent process. The context object includes bindings between a given set of names and an associated set of objects that are specific to the first operating system. For example, the context object could include a binding between the name "/sys/bin" and the object which implements a directory containing the binary files for the first operating system.

At some point during execution of the parent process it spawns a child process which was initially written to execute on top of a second operating system. To allow the parent process to successfully spawn the child process, and to allow the child process to execute on top of the third operating system, the preferred embodiment performs the following steps. First, the parent process instantiates a copy of its context object. Since the child process was initially written to run on top of the second operating system and not the first operating system, the child process needs to have bindings in its name space which are specifically associated with objects in the second operating system. Therefore, the parent process performs a context merge operation (discussed in more detail below), which ensures that object names used by the second process are interpreted relative to objects from a context object for the second operating system before (or in lieu of) being interpreted relative to objects from the context object for the first operating system.

Once the context merge operation is complete, the new context object is passed to the child process and execution of the child process begins. In this way, system calls initiated by the child process will first be interpreted relative to the name space for the second operating system. Thus, a system call by the child process to "Open/sys/bin/operating_system" will "Open" the binary files for the second operating system instead of the binary files for the first operating system. In this way two processes which were initially written to execute on top of two different operating systems can interoperate while executing on top of yet a third operating system.

The System For Practicing The Preferred Embodiment

Figure 1B:
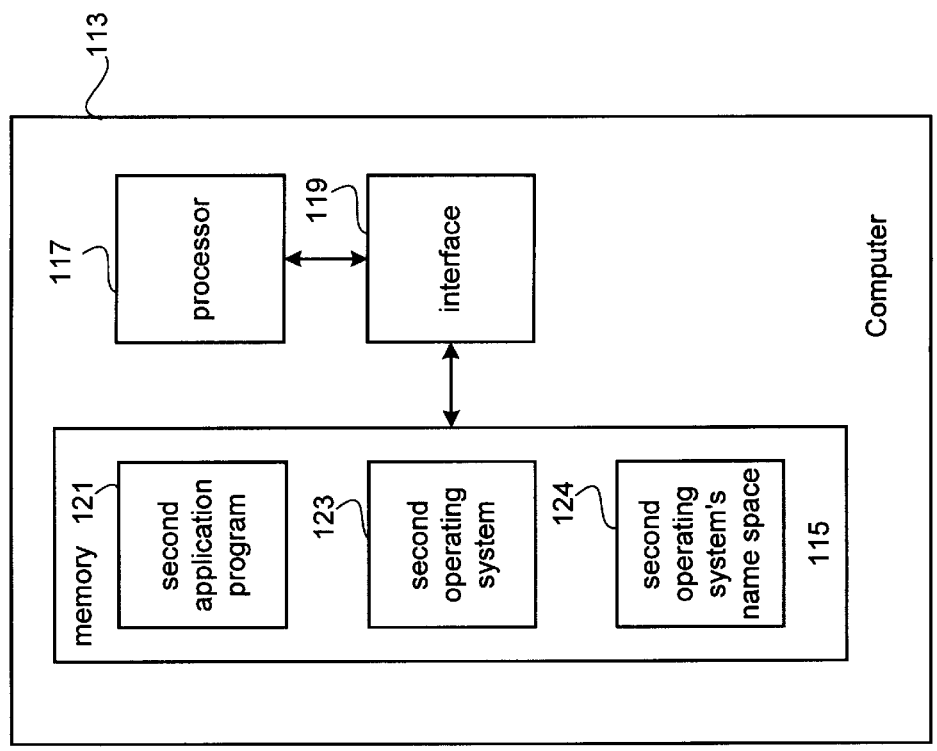
FIG. 1B illustrates a second application program which runs on top of a second operating system.
Figure 1A:
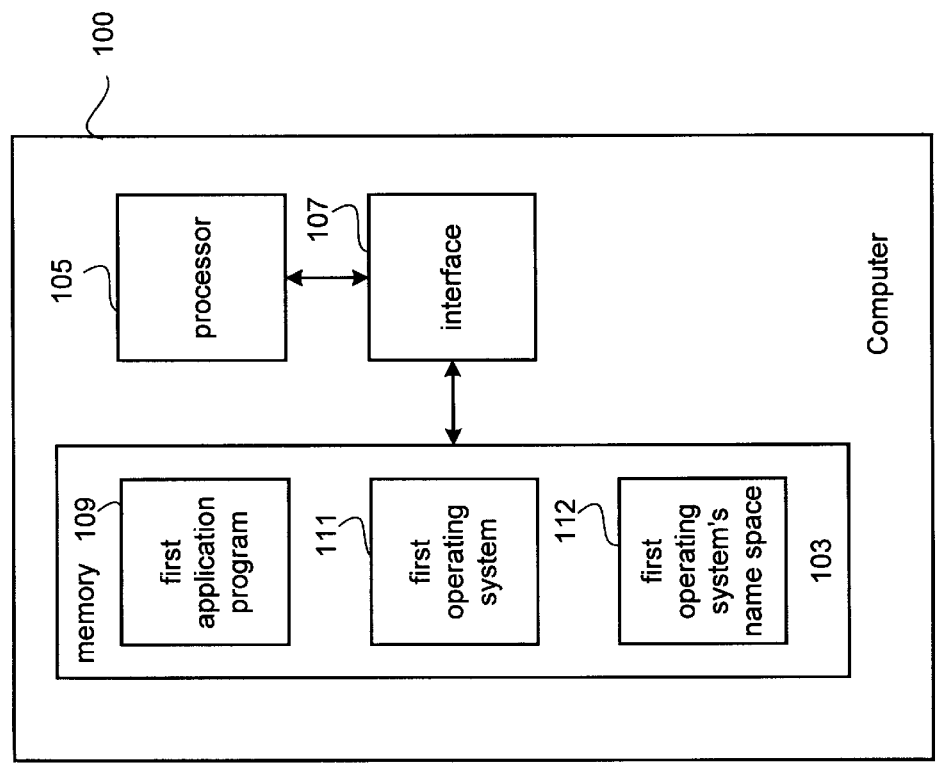
FIG. 1A illustrates a first application program which runs on top of a first operating system.
Figure 2:
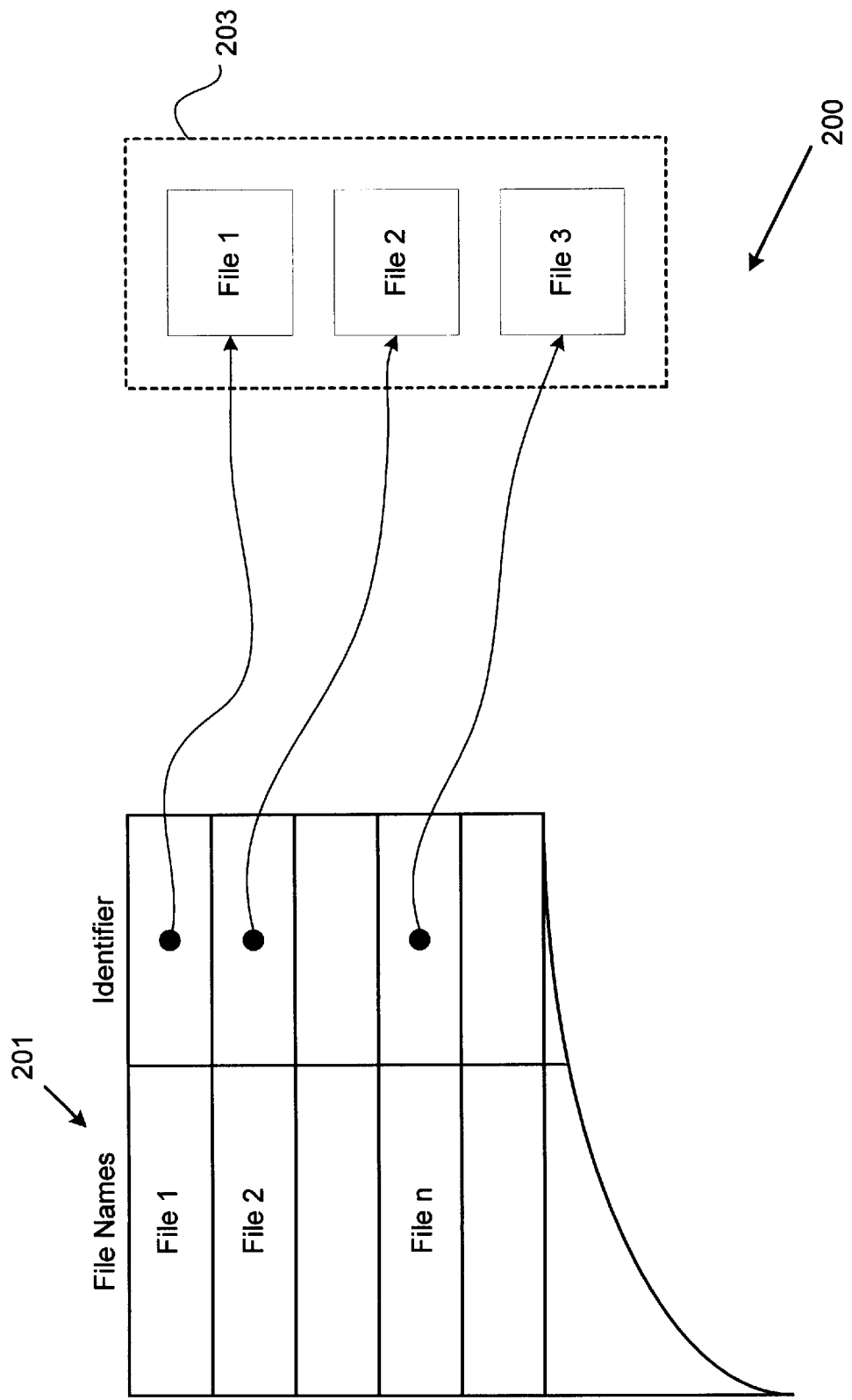
FIG. 2 illustrates a name space used to access directories and files in a computer system.
Figure 3:
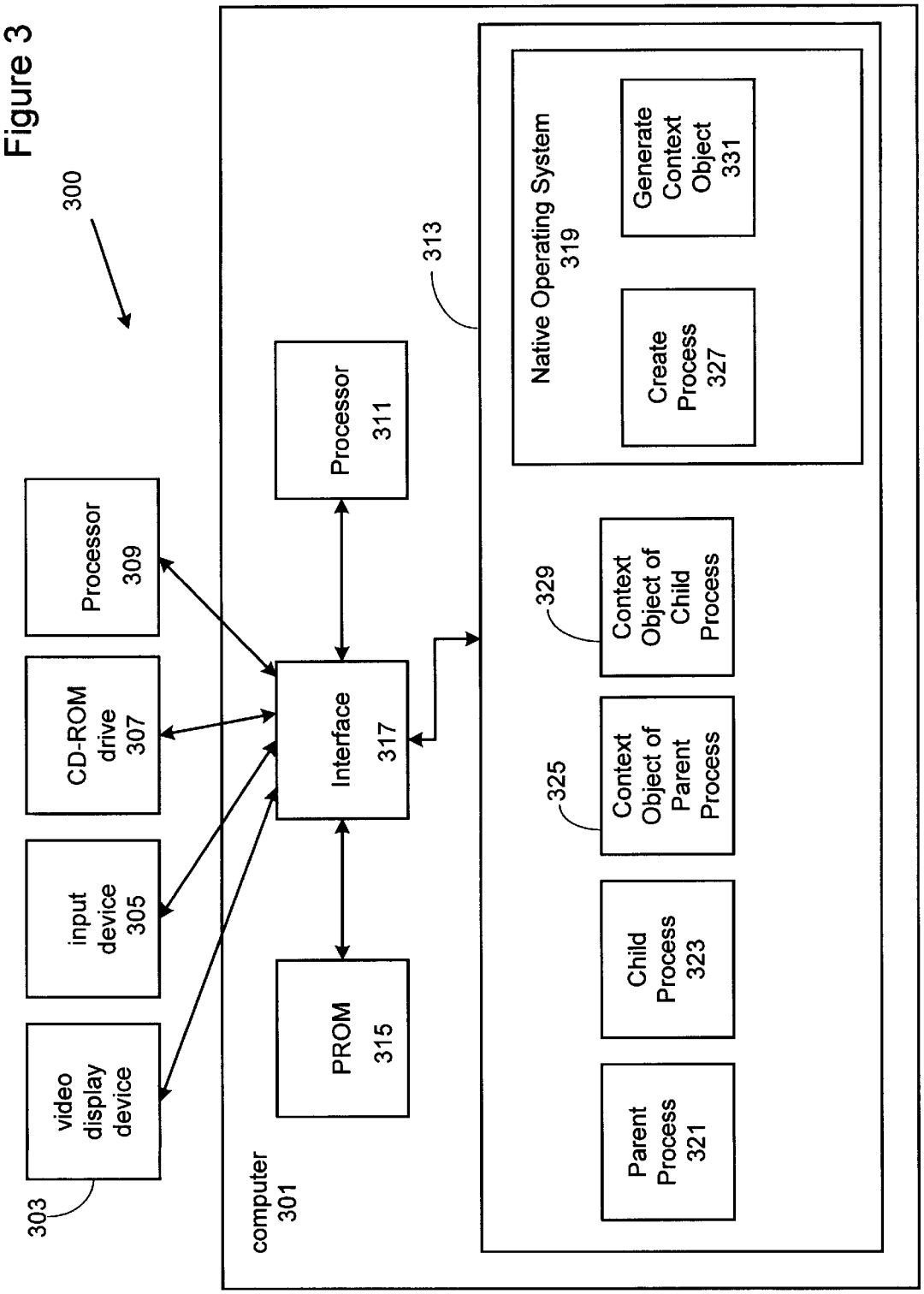
FIG. 3 is a block diagram of a computer system for practicing the preferred embodiment of the present invention.

FIG. 3 is a block diagram of a computer system 300 for practicing the preferred embodiment of the present invention. The computer system 300 includes a computer 301, a video display device 303, an input device 305, such as a keyboard, mouse, or pointing device, a CD-ROM drive 307, and a permanent storage device 309, such as a disk drive.

The computer 301 includes a processing unit 311 a random access memory ("RAM") 313, a programmable read-only memory ("PROM") 315, and an interface 317 for enabling communication between the processing unit 311 and the RAM 313 or the PROM 315. The interface 317 also facilitates communication between the processing unit 311 and peripheral devices (e.g., the video display device 303, the input device 305, and the CD-ROM device 307).

The computer memory 313 holds a number of items, including an operating system 319 that is responsible for controlling the allocation and usage of the system's hardware resources, such as memory 313, processing unit 311, and CD-ROM drive 307. The preferred operating system is the Spring operating system from Sun Microsystems, Inc., of Mountain View, Calif.

Overview Of The Spring Operating System

Spring is a distributed, object-oriented operating system. Thus the Spring operating system is based around the creation and manipulation of objects. A Spring object is an abstraction that is defined by an interface. An interface is a strongly-typed contract between an object and a client of the object. The interface specifies a set of operations that may be preformed on the object. Underlying the interface is an encapsulated set of data and methods which carry out the operations.

The granularity of Spring objects spans a wide range, from small data-like objects to large objects such as files and print services. The implementations vary from libraries, to separate protected servers, to distributed services implemented by multiple servers.

Unlike traditional operating systems, Spring objects are first class objects. Therefore, clients can manipulate objects directly by performing operations on them or passing them as parameters in operations on other objects. Typically, the client of an object is a process. A process includes an address space, threads, and other system resources.

In order to facilitate the retrieval and manipulation of these objects, Spring provides a uniform naming service. The Spring uniform naming service permits any object to be bound to any name. The Spring naming service is based on a few fundamental concepts: names, contexts, name bindings, the composition of name spaces, and context merges.

Names are conventionally represented as strings, are usually printable, and usually have some syntax for encoding different information by convention. A name is said to denote an object.

Figure 4:
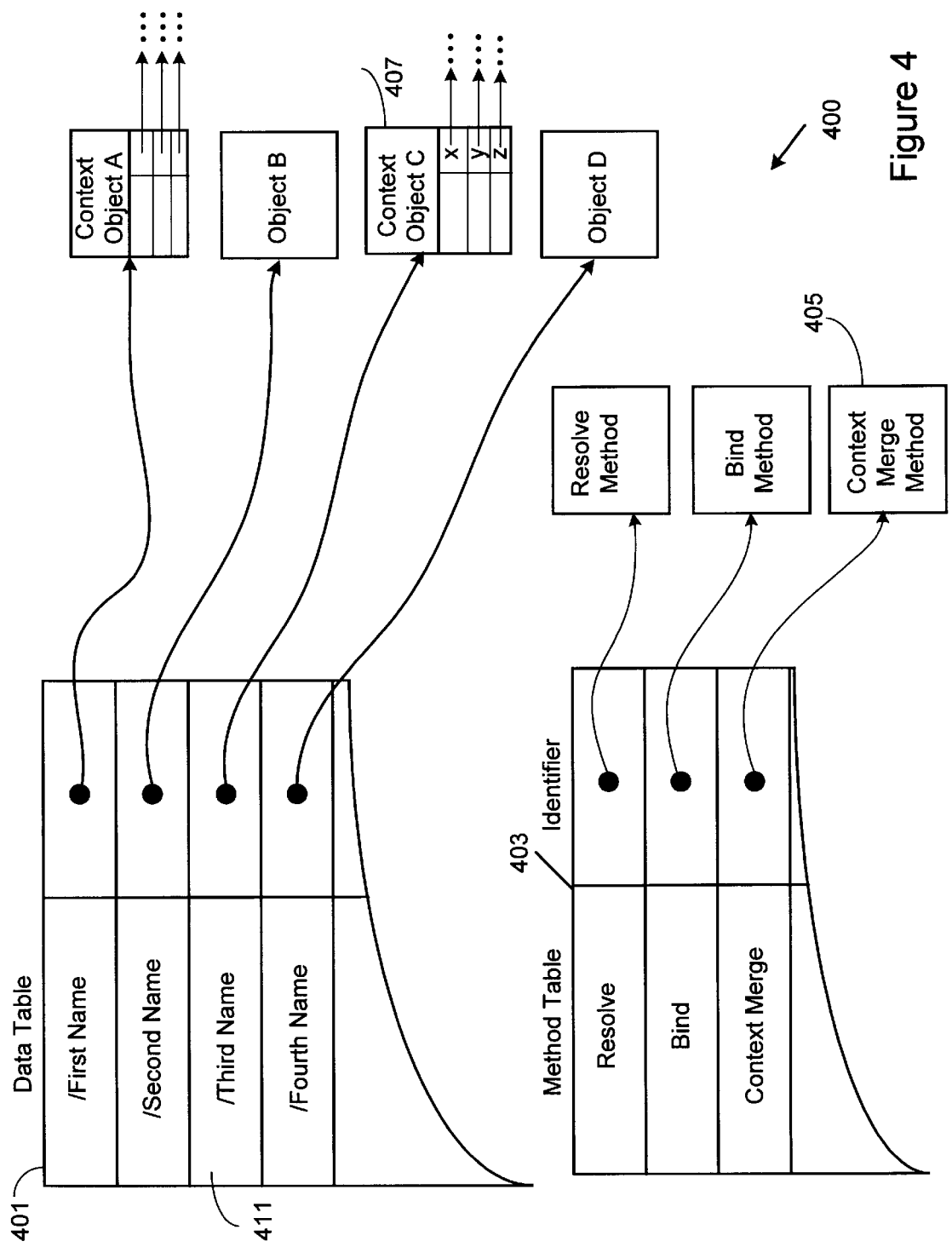
FIG. 4 is a block diagram of a context object.

FIG. 4 is a block diagram of a context object 400. The context object 400 contains a data table 401 which maintains a set of name-to-object associations (also called name bindings). In Spring, names have meaning only in the context object in which they are used. Thus an object may be bound to several different names in several different context objects at the same time.

A client of the uniform naming service performs naming operations via methods stored in a method table 403 of the context object 400. For example, the Spring context object allows the client to resolve a name of an object. Resolving a name on a context object obtains the object denoted by the name. The Spring context object also allows the client to bind a name to an object. Binding a name to a context object associates a name with a particular object.

Name space composition permits one name space to be attached to another name space. Context objects are often formed in this manner because, like any other object in the Spring environment, context objects can be bound to a name in a data table of some other context object. By binding one context object together with another context object it is possible to create a naming graph, which is a directed graph with nodes and labeled edges, where the nodes with outgoing edges are contexts. Informally, naming graphs and context objects are also referred to as name spaces. In short, Spring provides separate, system-supplied name spaces that can be composed together, instead of providing a single, system-supplied name space, as is traditionally done in the UNIX environment.

Figure 5:
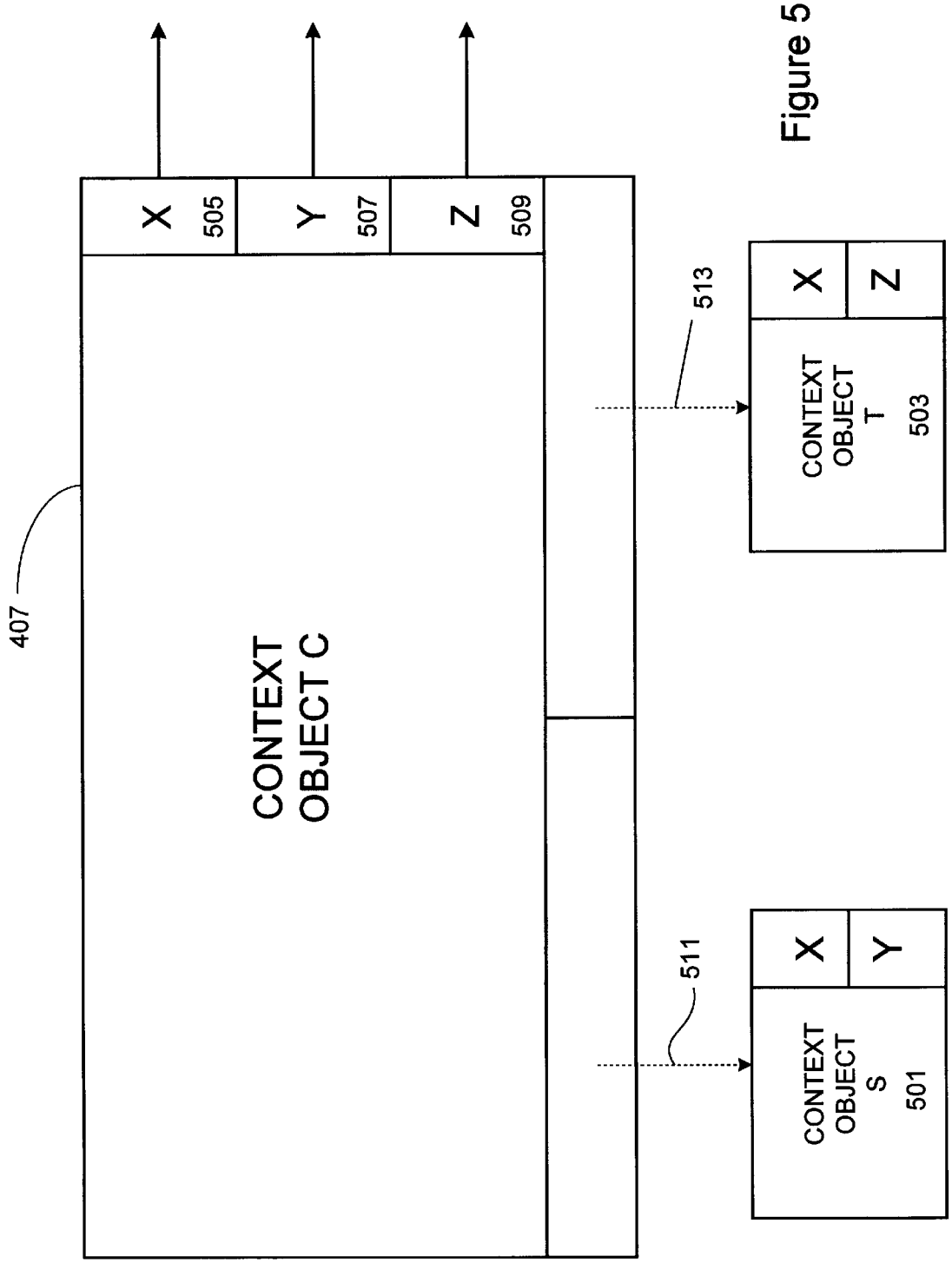
FIG. 5 is a block diagram of the context object after a context merge method has finished executing.

The context merge method extends the idea of name space composition to allow more than one context object to be bound to the same name within the same context object. FIG. 5 is a more detailed block diagram of context object "c" 407 and illustrates that context object "c" 407 is implemented by merging the objects from both context object "s" 501 and "t" 503 into context object "c" 407. As FIG. 5 illustrates, the object name "x" is bound to both context object "s" 501 and context object "t" 503. From a user's perspective, however, only object "x" 505 exists. To create this perspective for the user, the context merge method reorders the objects from the underlying context objects "s" 501 and "t" 503. For example, assume that context object 501 implements objects for a first operating system, context object "t" 503 implements objects for a second operating system, and that the process using context object "c" 407 was initially written to execute on top of the first operating system. In such a case the context merge method would order the objects from the underlying context objects to ensure that name resolutions were performed relative to the objects from context object "s" 501 before (or in lieu of) being performed relative to the objects from context object "t" 503. Hence a name resolution on object name "x" 505 would be resolved relative to the object "x" bound to context object "s" 501.

The Spring operating system is typically used on computers in a distributed network environment. The Spring operating system groups machines into "villages" based on geographical location, security considerations, administrative convenience and the like. For example, the accounting department of a corporation may have a separate village for security reasons. Similarly, different facilities in a university may each maintain its own village.

Given the scalability of context objects in the Spring operating system, context objects are provided at the process, machine, and village level. For example, context composition can be used to attach the context objects of the machines in a village together to help create a village context object.

Figure 6:
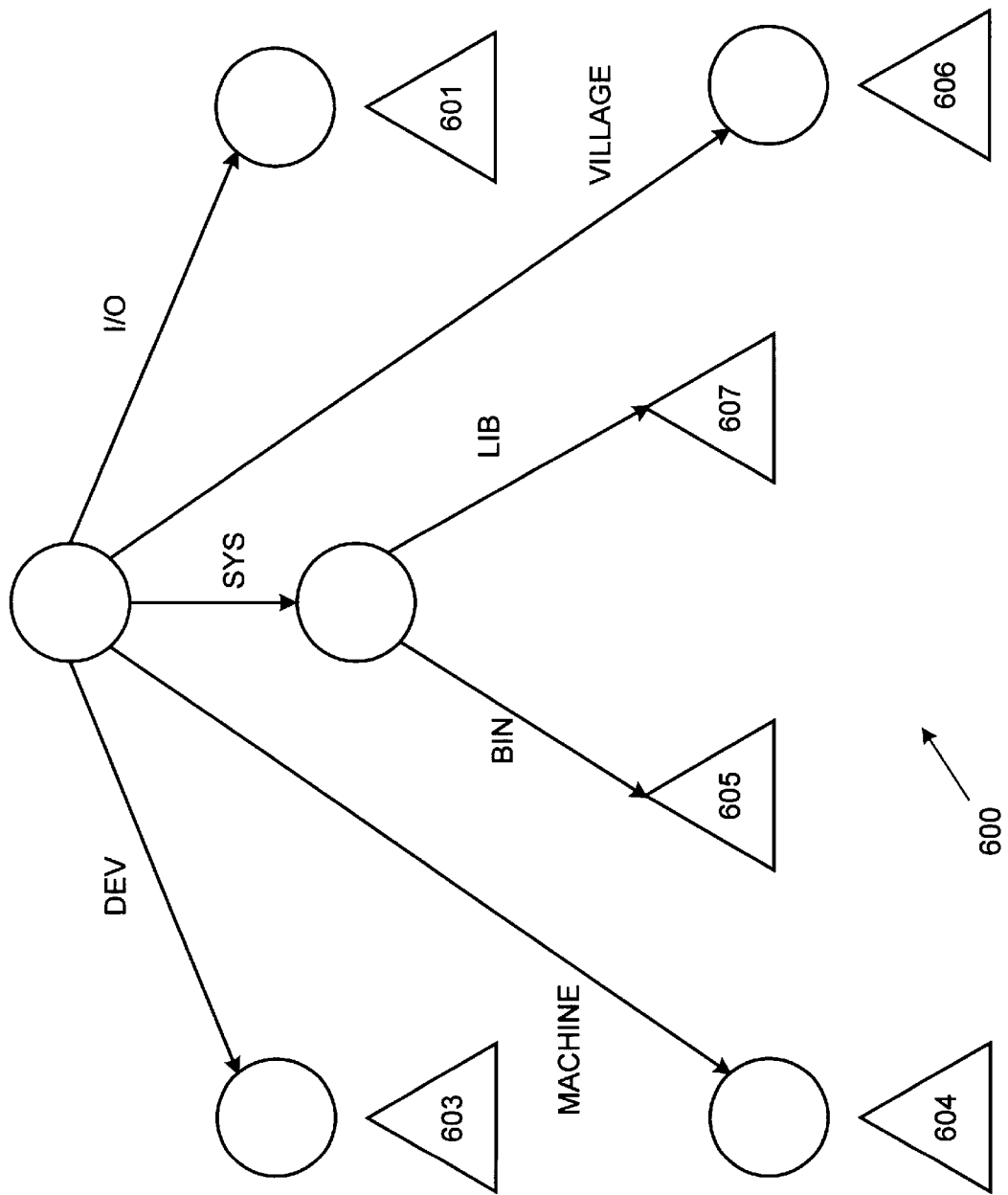
FIG. 6 graphically illustrates a per-process context object.

FIG. 6 graphically illustrates a per-process context object (or, simply, a "process context object") that is customized to access selected contexts of the machine and village name spaces within which the process is executing. The process context object typically contains private name bindings, shared name spaces, and-standard system objects.

Private name bindings include environment variables and program input/output objects (e.g., I/O context object 601). Changes made to private name bindings are only visible to the process containing those bindings.

Shared name spaces (i.e., objects shared with other processes in the machine and in the village) are typically attached to the process's name space using well known names. For example, a "users" context object containing the context objects of different users in the village may be attached to the process's context object. Likewise, the "device" context object containing both private and shared devices may also be attached (e.g., the "dev" context object 603). Finally, the context object 604 for the machine within which the process executes as well as the village context object 606 for the village within which the machine is located, are also attached. Any changes made to shared name spaces attached to the process's context object are visible to all sharing processes.

Context objects of processes also have context objects that contain system objects such as "sys" which, for example, may contain executables under a "/sys/bin" context object 605 and libraries under a "/sys/lib" context object 607.

The Preferred Method Of The Present Invention

An object of the preferred embodiment is to facilitate interoperability between a parent process and a child process even though the parent process and the child process were initially written to run on top of two distinct operating systems, both of which are different than a native operating system on which the processes currently run. The preferred embodiment will be discussed with reference to FIG. 3 and FIGS. 7 through 11.

Certain initial conditions exist before the preferred embodiment executes on the computer 301. First, the system 300 is booted and running on top of the native operating system 319. In addition, the parent process 321 has been obtained (e.g., a word processing program written to run under the Solaris 1.x operating system has been launched). A context object 325 of the parent process 321 has also been obtained in order to map object names generated by the parent process within a name space appropriate to the parent process 321.

Figure 7:
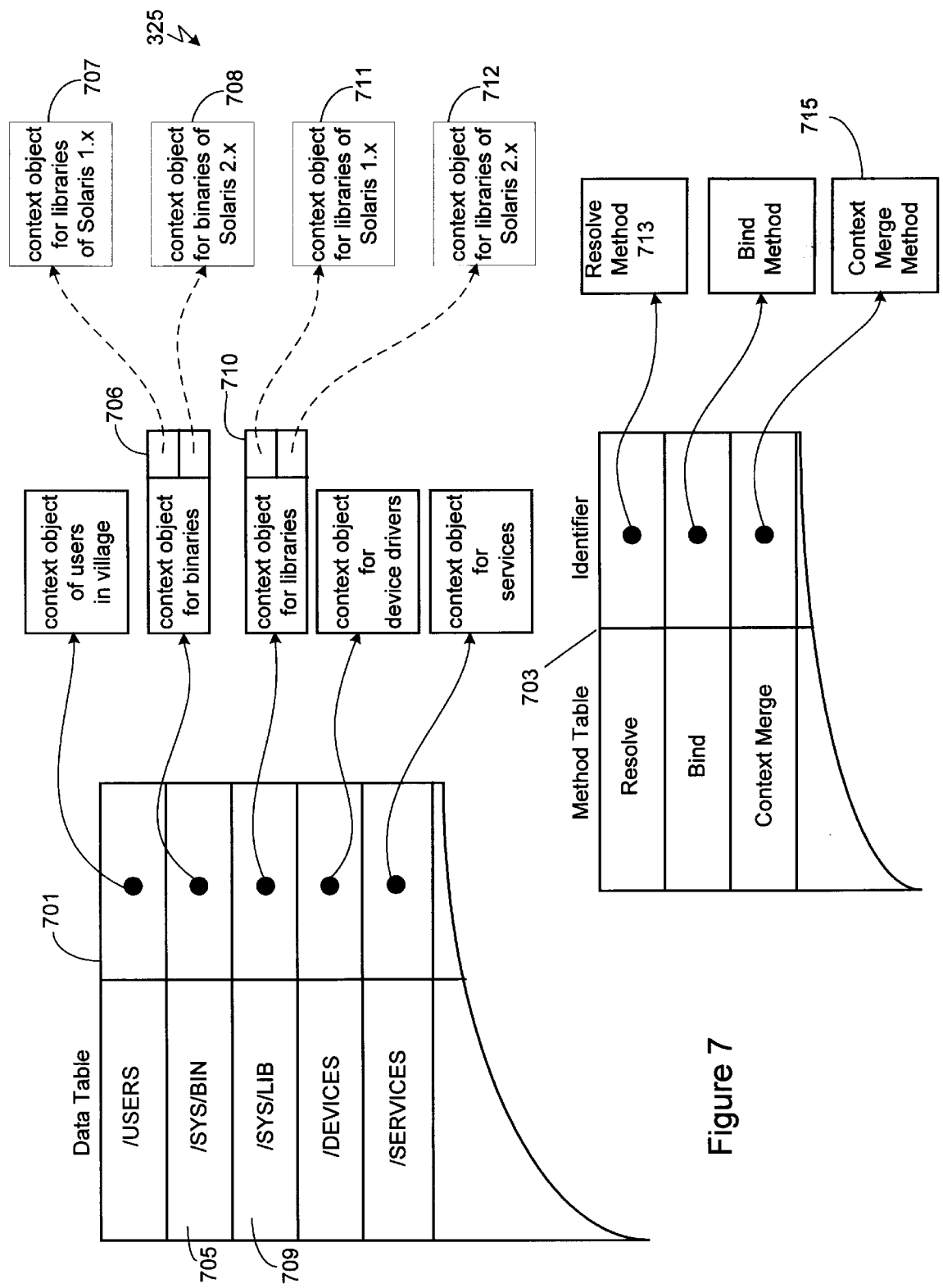
FIG. 7 illustrates the context object of a parent process.

FIG. 7 illustrates the context object 325 of the parent process 321. The context object 325 includes a data table 701 and a method table 703. The data table 701 maps object names to their corresponding objects. For example, because the parent process 321 was initially written to run on top of the Solaris 1.x family of operating systems, entry 705 in data table 701 first maps the name "/sys/bin" into objects bound to a context object 707. These objects implement the binary files for the Solaris 1.x family of operating systems. Only if the name being resolved is not bound to an object from the context object 707 does entry 705 examine objects bound to context object 708. The bindings in context object 708 map names to objects implementing the binary files for the Solaris 2.x family of operating systems. In this way the parent process is able to invoke objects from the Solaris 2.x operating system even though the parent process was initially written to run on top of Solaris 1.x. Similarly, entry 709 first maps the name "/sys/lib" into objects from a context object 711. These objects contain libraries for the Solaris1.x family of operating systems. Only if the name being resolved is not bound to an object from the context object 711 does entry 709 examine objects from a context object 712. Objects from context object 712 implement the library files for the Solaris 2.x family of operating systems.

Figure 8:
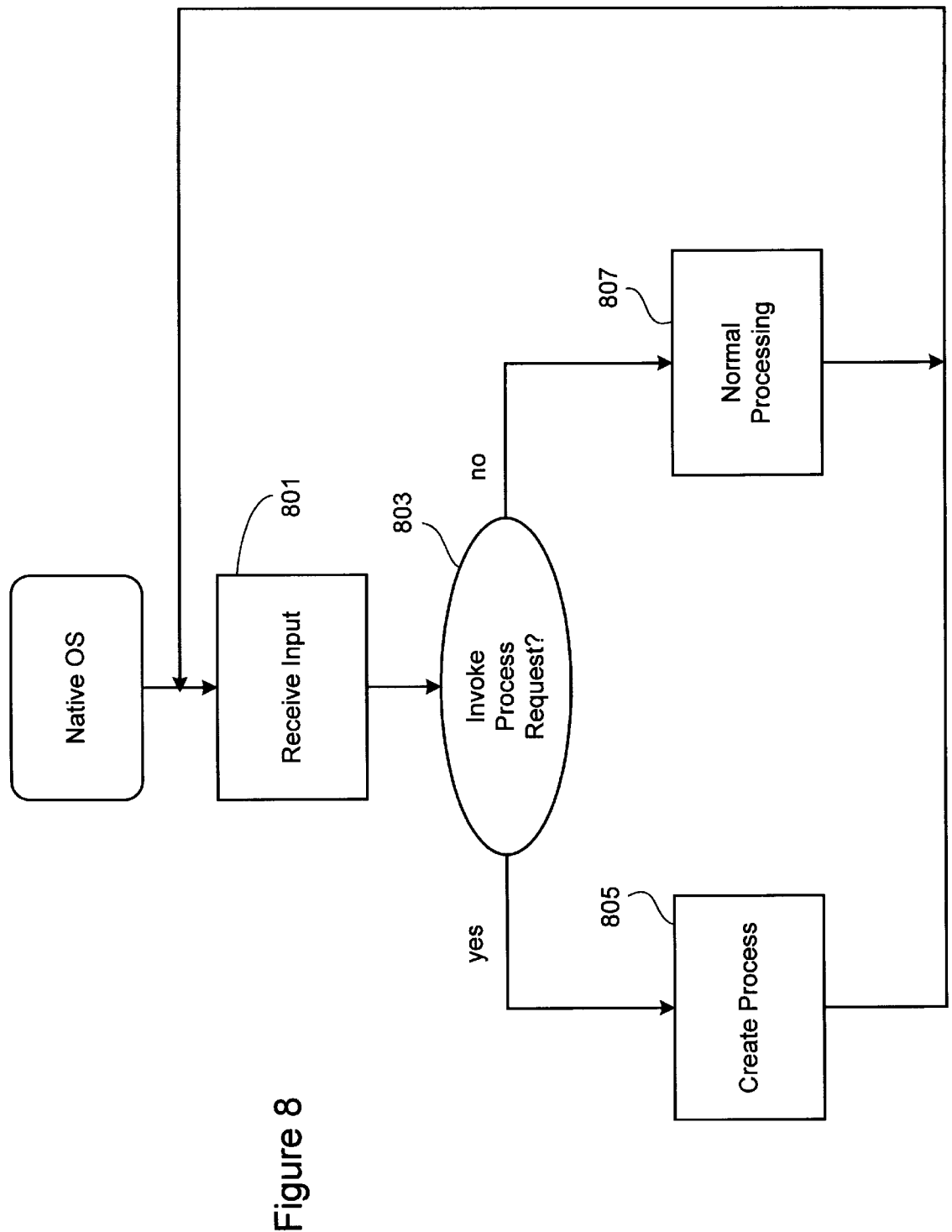
FIG. 8 is a flow diagram of a Native OS procedure.

Once the initial conditions have been satisfied, the parent process is free to send requests to the native operating system 319. FIG. 8 is a flow diagram of the Native OS procedure which carries out requests from processes in the system 300. While the native operating system 319 actually performs a myriad of operations in the system 300, for clarity, only the operation to create a new process is discussed in detail herein. In step 801 the native operating system receives input from the system 300. In step 803 the native operating system 319 determines whether the input was an "invoke process" request. If the input was an "invoke process" request then processing continues with step 805. In step 805 the native operating system 319 calls the Create Process procedure 327. The Create Process procedure allocates address space for the process, generates threads for the process, and generates a context object which embodies a name space for the process. Upon return from the Create Process procedure, processing continues in step 801.

If the input was not an invoke process request then in step 807 the native operating system 319 performs normal processing. For example, if an exit request was received, the native operating system 319 would end processing in the computer 301.

Figure 9:
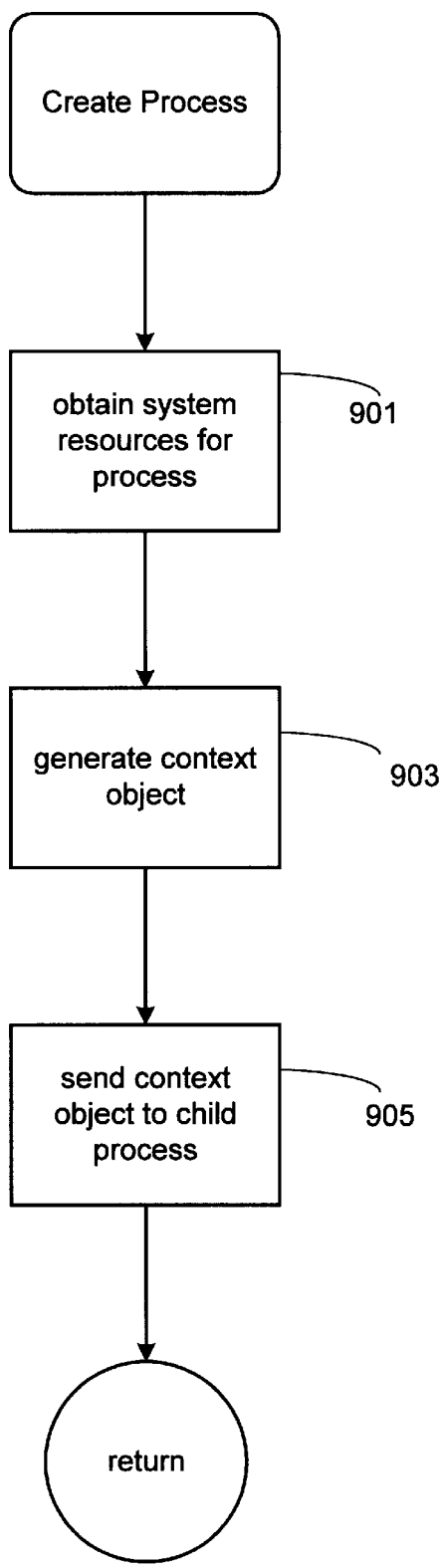
FIG. 9 is a flow diagram of a Create Process procedure.

FIG. 9 is a flow diagram of the Create Process procedure. In step 901 the Create Process procedure obtains the system resources needed to implement a process. For example, the Create Process procedure typically obtains an address space in the memory 313, generates one or more threads, and maps any code associated with the process into the process's address space. In step 903 the Create Process procedure calls the Generate Context Object procedure which generates a new context object for the new process. Upon return from step 903, the new context object is sent to the child process in step 905.

Figure 10:
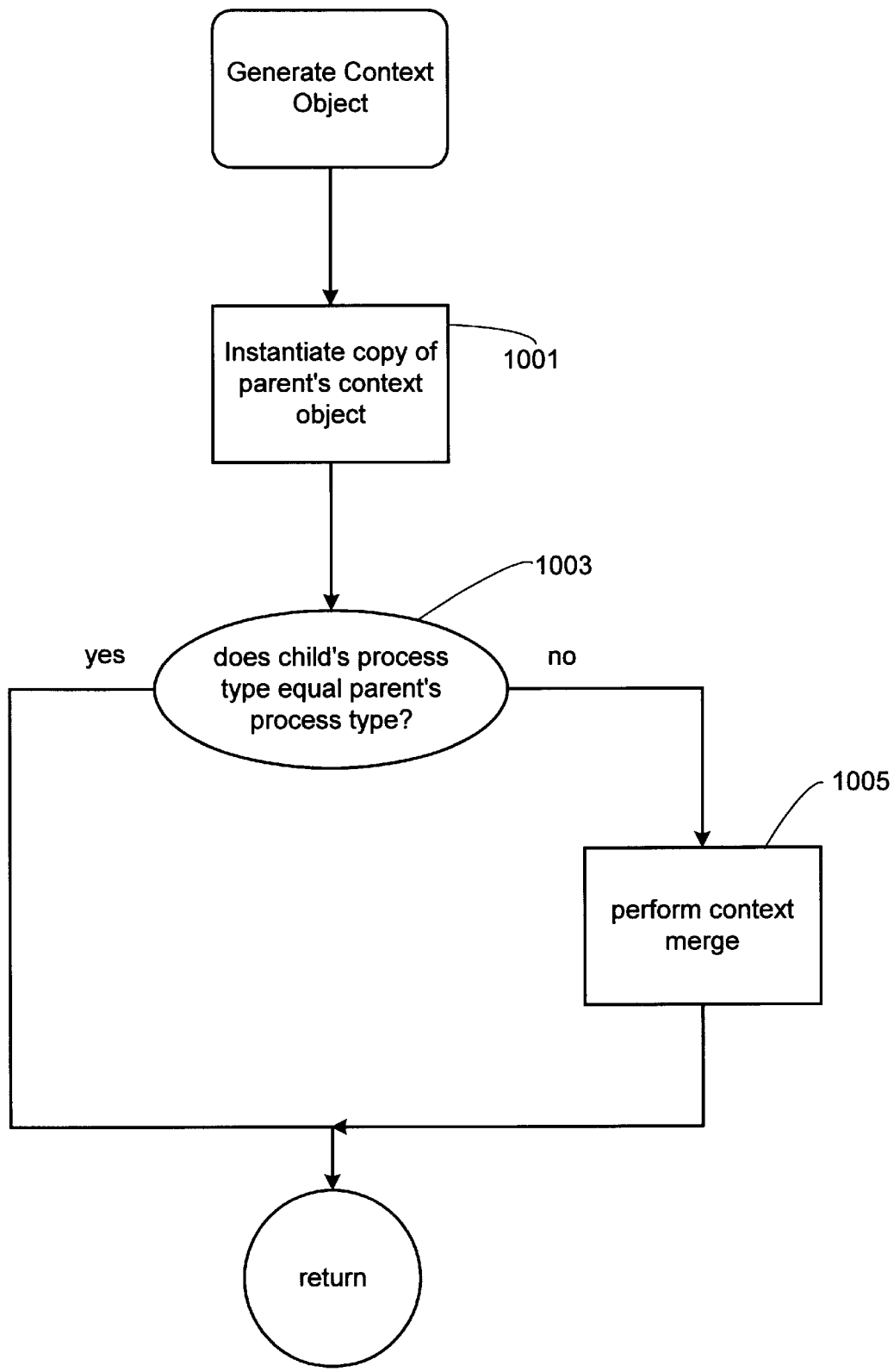
FIG. 10 is a flow diagram of a Generate Context Object procedure.

FIG. 10 is a flow diagram of the Generate Context Object procedure which creates a context object for a process. For example, the Generate Context Object procedure may be called by the parent process 321 to create the context object 329 for the child process 323.

In step 1001 the Generate Context Object procedure instantiates a copy of the context object 325 of the parent process 321. A copy of the parent's context object 325 is instantiated in step 1001 because the child process either uses a copy of the parent's context object as its own context object or the parent's context object is used as the foundation for building the context object 329 of the child process 323.

Once a copy of the parent's context object has been instantiated, processing in the Generate Context Object procedure takes one of two paths, depending on a comparison of a "process type" of the child process with a "process type" of the parent process (step 1003). A "process type" indicates which operating system the process was initially written to run on top of. For example, if the parent process 321 was initially written to execute on top of the Solaris 1.x operating system then the "process type" of the parent process is "Solaris 1.x.". The "process type" of a process is preferably stored in a header section of a file which stores code used to generate the process. For example, the file which stores the code used to implement a spreadsheet program typically includes a header section which contains "process type" information for the spreadsheet program. If the comparison indicates that the child process 323 and the parent process 321 were both initially written to run on top of the same operating system (e.g., the Solaris 1.x operating system) then the child process 323 is fully compatible with the parent process' context object 325 and, therefore, just uses the copy of the parent's context object as its own context object 329. An example may help illustrate this compatibility between the child process and the parent process. If the child process 323 invokes a library function using the name "/sys/lib" then the child process 323 will expect to retrieve a function from the Solaris 1.x library. By resolving the name "/sys/lib" relative to a copy of the context object 325 of the parent 321, the context object 711 (FIG. 7) containing the libraries of the Solaris operating system 1.x is accessed. In this way, the appropriate object from the Solaris 1.x library is returned to the child process 323 for further processing.

If the comparison indicates that the child process 323 and the parent process 321 were both written to run on top of two different operating systems (e.g, the Solaris 1.x operating system and the Solaris 2.x operating system) then the child process 323 is not fully compatible with the context object 325 of the parent process 321. This incompatibility can also be seen by way of example using FIG. 7. Assume that the child process 323 invokes a request to resolve a name containing the string "/sys/lib" or "/sys/bin". Also assume that the child process 323 is resolving the name relative to a copy of the context object 325 of the parent process 321. In this case the child process 323 will receive an object from the name space of the Solaris 1.x operating system. The child process 323 instead needs access to objects containing binaries or libraries of the Solaris 2.x operating system. To provide the child process 323 with access to the appropriate objects in the Solaris 2.x name space, the Generate Context Object procedure, in step 1005, invokes a context merge method 715 (FIG. 7). The context merge method 715 orders the context objects so that the objects most appropriate to the child process are accessed first when resolving an object name.

To accomplish this the context merge method 715 first determines the "process type" of the child process 323. The process type indicates the operating system the process was initially written to run on top of. The process type of the child process 323 is the Solaris 2.x operating system. Next, the context merge method 715 determines the process type of the parent process 321. The process type of the parent process 321 is the Solaris 1.x operating system. Given the process type of the parent process and the process type of the child process, the context merge method determines what information in the data table 701 needs to be modified in order to fully support the child process 323. The needed modifications are dependent on the process types of the context objects being merged.

Figure 11:
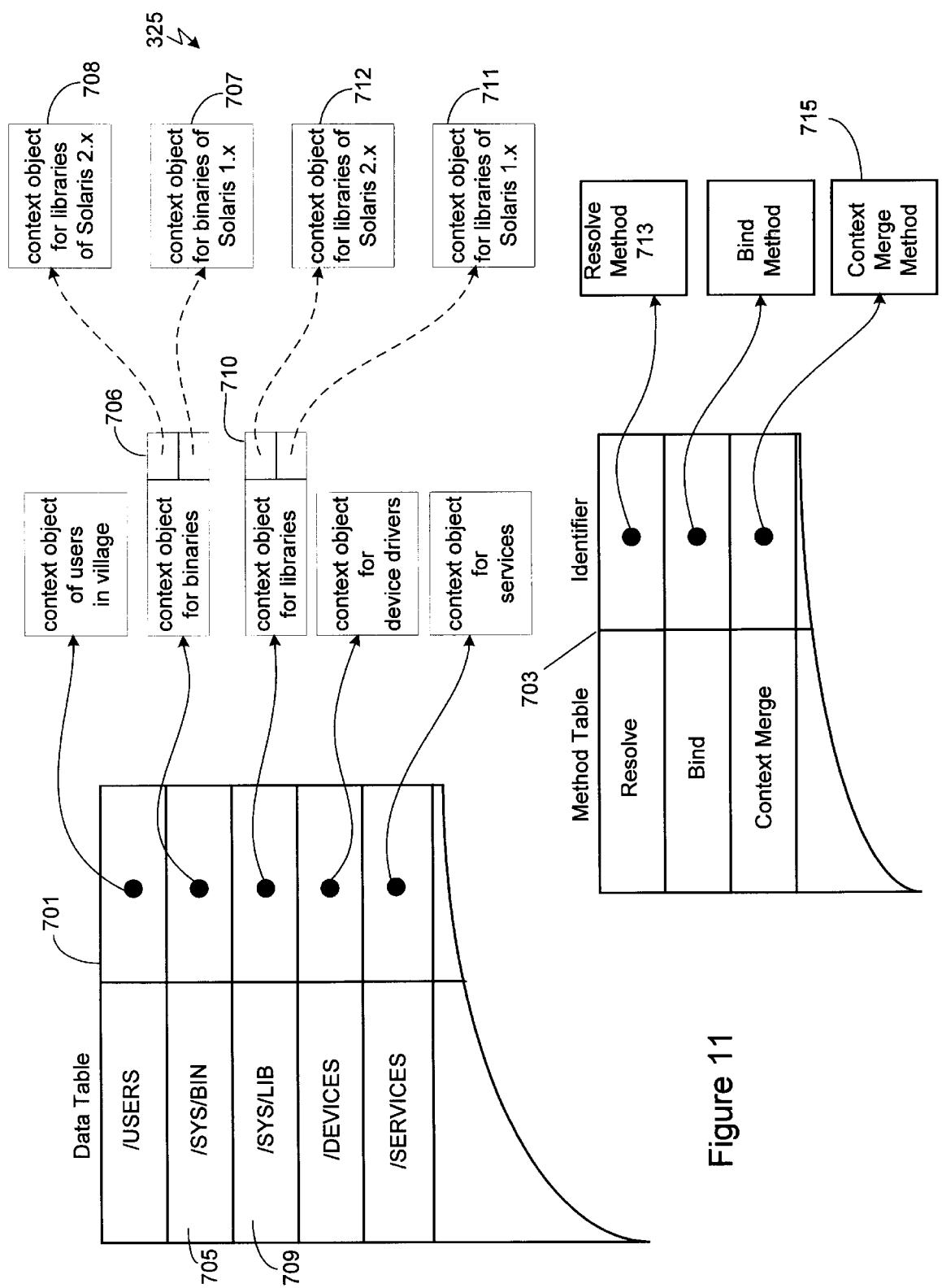
FIG. 11 illustrates the context object of a child process.

FIG. 11 illustrates the modifications made to the (Solaris 1.x) context object 325 in order to provide full compatibility to the (Solaris 2.x) context process 323. First, the context merge method 715 modifies entry 705 of the data table 701 to indicate that a context merge operation has been performed on the object name "/sys/bin". The preferred syntax for indicating that the context merge operation has been performed on an entry uses the symbol "::" followed immediately by an identifier. For example, the context merge method modifies entry 705 to read "/sys/bin=Solaris 2.x:: Solaris 1.x" to indicate that the name "/sys/bin" is first resolved relative to objects from a context object 708 containing binaries of the Solaris 2.x operating system. Only if the name "/sys/bin" is not bound to objects in context object 708 are objects from context object 707, containing binaries of the Solaris 1.X operating system, examined. The context merge method 715 makes similar modifications to entry 709 to indicate that the name "/sys/lib" is resolved relative to objects from a context object 712 for libraries of the Solaris 2.x operating system before (or in lieu of) resolving the name relative to objects from context object 711 containing libraries of the Solaris 1.x operating system.

After the generate context object procedure completes the context merge operation in step 1005 of FIG. 10, processing continues in step 905 of the Create Process procedure (FIG. 9). In step 905 the Create Process procedure sends the context object 329 to the child process 323.

Once the child process 323 receives the context object 329, the child process can safely perform any of its operations because the object names contained in the operation requests will be resolved relative to objects from the appropriate context object. In this way, a parent process written to execute on top of a first operating system, can spawn a child process written to execute on top of a second operating system, while both the parent process and the child process are actually executing on top of yet a third operating system.

Although the present invention has been described in terms of a preferred embodiment, it is not intended that the invention be limited to this embodiment. Modifications within the spirit of the invention will be apparent to those skilled in the art.

Those of ordinary skill will understand that the teachings of the present invention could be coupled with the use of symbolic links to map more abstract names into the entries of the data table 701. For example, while data entry 705 was described as containing the name "/sys/bin", a symbolic link could be used to first map the name "/bin" into the table entry 705 for "/sys/bin." In addition, the entry 705 could then be linked to yet another entry in the table corresponding to a particular type of operating system. For example, the entry "/sys/bin" could be mapped into an entry for "/Solaris 1.x" which contains a link to the context object containing the binaries for the Solaris 1.x operating system.

While the examples above discuss instantiating a copy of the parent's context object in order to obtain the child's context object, those of ordinary skill will understand that optimizations of this method are possible. For example, another embodiment of the present invention statically generates preferred context objects for each non-native operating system which the native operating system supports. A server preferably stores each preferred context object When a child process needs a context object, the appropriate context object is retrieved from the server.

Finally, while the examples set forth above discuss facilitating interoperability between two processes intended to run on two different operating systems, those of ordinary skill will understand that the techniques discussed herein can be extended to facilitate interoperability between "N" processes intended to run on "N" different operating systems. These and other modifications will be apparent to those skilled in the art.

What is claimed is:

1. A method executed in a computer system which facilitates interoperability between processes which were designed to execute on different operating systems, the computer system including a processor and a memory, the computer system including one or more context objects, each context object maintaining bindings between object names and their associated object implementations, wherein an associated object implementation can itself be another context object, the computer system also including a parent process which was designed to execute on a second operating system but is executing on a first operating system that is controlling the computer system, the method comprising:

under control of the first operating system, receiving a request from the parent process to launch for execution on the first operating system a child process which was intended to execute on a third operating system;

launching the child process;

obtaining a context object under control of the first operating system for the child process;

performing a context merge operation under control of the first operating system on the context object for the child process; and in response to performing the context merge operation, resolving a selected object name on the context object for the child process by accessing objects from a context object associated with the third operating system before accessing objects from the context object associated with the second operating system such that the child process and the parent process both execute on the first operating system, whereby interoperability is facilitated between the parent process that was designed to execute on the second operating system and the child process that was designed to execute on the third operating system, wherein the third operating system and the second operating system are different, and wherein the first operating system is a native operating system.

2. A method executed in a computer system which facilitates interoperability between processes which were designed to execute on different operating systems, the computer system including a processor and a memory, the computer system also including one or more context objects, each context object maintaining bindings between object names and their associated object implementations, wherein an associated object implementation can itself be another context object, the method comprising the steps of:

under control of a first operating system,
invoking for execution on the first operating system a parent process which was designed to execute on a second operating system;
obtaining for the parent process a context object which itself binds at least one context object associated with the second operating system to a selected object name;
during execution of the parent process, launching for execution on the first operating system, a child process which was designed to execute on a third operating system;
obtaining a context object under control of the first operating system for the child process which includes substantially the same name bindings found in the context object for the parent process;
performing a context merge operation under control of the first operating system on the context object of the child process; and
in response to performing the context merge operation, resolving the selected object name on the context object for the child process by accessing objects from a context object associated with the third operating system before accessing objects from the context object associated with second operating system such that the child process and the parent process both execute on the first operating system,
whereby interoperability is facilitated between the child process which was intended to execute on the third operating system and the parent process which was intended to execute on the second operating system, wherein the third operating system and the second operating system are different, and wherein the first operating system is a native operating system.

3. The method of claim 2 wherein the step of performing the context merge operation further includes generating a new context object which includes all objects from the context objects for the second operating system and the third operating system.

4. The method of claim 3 wherein the objects are ordered so that the step of resolving the selected object name accesses objects from the context object associated with the third operating system before it accesses objects from the context object associated with the second operating system.

5. The method of claim 2 wherein the step of performing the context merge operation further includes creating a link between the selected object name and the context objects for the second operating system and the third operating system.

6. The method of claim 5 wherein the link indicates that the selected object name should be resolved relative to the context object for the third operating system before being resolved relative to the context object for the second operating system.

7. The method of claim 5 wherein the link is implemented as a list data structure and wherein the step of performing the context merge operation further includes the step of moving the context object for the third operating system to a first position in the list.

8. The method of claim 2 wherein the step of performing the context merge operation further includes inserting the context object for the third operating system into a first position of a list data structure, wherein the list data structure associates the selected object name with one or more context objects which resolve the selected object name.

9. The method of claim 2 wherein the step of obtaining the context object for the child process includes the step of invoking a duplicate function which resides in the context object of the parent process.

10. The method of claim 2 wherein the step of obtaining the context object for the child process includes the steps of sending a request to a server which stores a pre-processed context object for the child process and receiving the requested context object from the server.

11. The method of claim 2 wherein the child process invokes an object from the context object for the second operating system by resolving an object name in the context object for the second operating system.

12. The method of claim 2 wherein the parent process invokes an object from the context object for the third operating system by resolving an object name in the context object for the third operating system.

13. A method executed in a computer system which facilitates interoperability between processes which were designed to execute on different operating systems, the computer system including a processor and a memory, the computer system including one or more context objects, each context object maintaining bindings between object names and their associated object implementations, wherein an associated object implementation can itself be another context object, the computer system also including a parent process which was designed to execute on a second operating system but is executing on a first operating system that is controlling the computer system, the method comprising under control of the first operating system,
providing a first mechanism for receiving a request from the parent process to launch for execution on the first operating system a child process which was intended to execute on a third operating system;
providing a second mechanism for launching for execution on the first operating system the child process;
providing under control of the first operating system a third mechanism for obtaining a context object for the child process;
providing under control of the first operating system a fourth mechanism for performing a context merge operation on the context object for the child process; and
providing a fifth mechanism, responsive to performing the context merge operation, for resolving a selected object name on the context object for the child process by accessing objects from a context object associated with the third operating system before accessing objects from the context object associated with the second operating system such that the child process and the parent process both execute on the first operating system,
whereby interoperability is facilitated between the child process which was intended to execute on the third operating system and the parent process which was intended to execute on the second operating system, wherein the third operating system and the second operating system are different, and wherein the first operating system is a native operating system.

14. A method executed in a computer system which facilitates interoperability between processes which were designed to execute on different operating systems, the computer system including a processor and a memory, the computer system also including one or more context objects, each context object maintaining bindings between object names and their associated object implementations, wherein an associated object implementation can itself be another context object, the method comprising:

provinding a first operating system for, invoking for execution on the first operating system a parent process which was designed to execute on a second operating system;

obtaining under control of the first operating system for the parent process a context object which itself binds at least one context object associated with the second operating system to a selected object name;

during execution of the parent process, launching for execution on the first operating system a child process which was designed to execute on a third operating system;

obtaining under control of the first operating system a context object for the child process which includes substantially the same name bindings found in the context object for the parent process;

performing under control of the first operating system a context merge operation on the context object of the child process; and in response to performing the context merge operation, resolving the selected object name on the context object for the child process by accessing objects from a context object associated with the third operating system before accessing objects from the context object associated with the second operating system such that the child process and the parent process both execute on the first operating system, whereby interoperability is facilitated between the parent process which was designed to execute on the second operating system and the child process which was designed to execute on the third operating system, wherein the third operating system and the second operating system are different, and wherein the first operating system is a native operating system.

15. A computer system for facilitating interoperability between processes which were designed to execute on different operating systems, the computer system including a processor and a memory, the computer system including one or more context objects, each context object maintaining bindings between object names and their associated object implementations, wherein an associated object implementation can itself be another context object, the system comprising:

a first operating system configured to control, a first program mechanism configured to invoke for execution on the first operating system a parent process which was designed to execute on a second operating system;

a second program mechanism under control of the first operating system configured to obtain for the parent process a context object which itself binds at least one context object associated with the second operating system to a selected object name;

a third program mechanism configured to start on the first operating system a child process which was designed to execute on a third operating system;

a fourth program mechanism under control of the first operating system configured to obtain a context object for the child process which includes the same name bindings found in the context object for the parent process;

a fifth program mechanism under control of the first operating system configured to perform a context merge operation on the context object of the child process; and responsive to the context merge operation, a sixth program mechanism configured to resolve the selected object name on the context object for the child process by accessing objects from a context object associated with the third operating system before accessing objects from the context object associated with the second operating system such that the child process and the parent process both execute on the first operating system, whereby interoperability is facilitated between the parent process which was intended to execute on the second operating system and the child process which was intended to execute on the third operating system, wherein the third operating system and the second operating system are different, and wherein the first operating system is a native operating system.

16. The system of claim 15 wherein the fifth program mechanism includes a seventh program mechanism configured to generate a new context object which includes all objects from the context objects for the second operating system and the third operating system.

17. The system of claim 16 wherein the objects in the new context object are ordered so that the sixth program mechanism accesses objects from the context object associated with the third operating system before it accesses objects from the context object associated with the second operating system.

18. The system of claim 15 wherein the fifth program mechanism further includes a seventh program mechanism configured to create a link between the selected object name and the context objects for the second operating system and the third operating system.

19. The system of claim 18 wherein the link indicates that the selected object name should be resolved relative to the context object for the third operating system before being resolved relative to the context object for the second operating system.

20. The method of claim 18 wherein the link is implemented as a list data structure and wherein the fifth program mechanism further includes an eight program mechanism configured to move the context object for the third operating system to a first position in the list.

21. The system of claim 15 wherein the fifth program mechanism invokes a seventh program mechanism configured to insert the context object for the third operating system into a first position of a list data structure, wherein the list data structure associates the selected object name with one or more context objects which resolve the selected object name.

22. The system of claim 15 wherein the sixth program mechanism includes a seventh program mechanism configured to invoke a duplicate function which resides in the context object of the parent process.

23. The system of claim 15 wherein the sixth program mechanism includes a seventh program mechanism configured to send a request to a server which stores a preprocessed context object for the child process and to receive the requested context object from the server.

24. A computer system which facilitates interoperability between processes which was designed to execute on different operating systems, the computer system including a processor and a memory, the computer system including one or more context objects, each context object maintaining bindings between object names and their associated object implementations, wherein an associated object implementation can itself be another context object, the computer system also including a parent process which was designed to execute on a second operating system but is executing on a first operating system, the system comprising:

the first operating system configured to control,
- a first mechanism configured to receive a request from the parent process to launch for execution on the first operating system a child process which was designed to execute on a third operating system;
- a second mechanism configured to launch the child process;
- a third mechanism configured to obtain a context object for the child process;
- a fourth mechanism configured to perform a context merge operation on the context object of child process; and
- a fifth mechanism, responsive to the fourth mechanism and configured to resolve selected object name on the context object of the child process by accessing objects from a context object associated with third operating system before accessing objects from the context object associated with the second operating system such that the child process and the parent process both execute on the first operating system, whereby interoperability is facilitated between the parent process which was designed to execute on the second operating system and the child process which was designed to operate on the third operating system, wherein the third operating system and the second operating system are different, and wherein the first operating system is a native operating system.

* * * * *